United States Patent
Gupta et al.

(10) Patent No.: US 10,206,140 B2
(45) Date of Patent: Feb. 12, 2019

(54) METHOD AND APPARATUS FOR OPERATING A DEVICE ON A LICENSED SPECTRUM AND AN UNLICENSED SPECTRUM

(71) Applicant: Motorola Mobility LLC, Chicago, IL (US)

(72) Inventors: Ranjeet Gupta, Naperville, IL (US); James Van Bosch, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 213 days.

(21) Appl. No.: 15/341,900

(22) Filed: Nov. 2, 2016

(65) Prior Publication Data
US 2018/0124643 A1 May 3, 2018

(51) Int. Cl.
*H04W 28/08* (2009.01)
*H04W 16/14* (2009.01)
(Continued)

(52) U.S. Cl.
CPC ......... *H04W 28/085* (2013.01); *H04W 16/14* (2013.01); *H04W 28/0268* (2013.01);
(Continued)

(58) Field of Classification Search
CPC ..... H04W 28/08; H04W 48/16; H04W 84/12; H04W 28/02; H04W 16/14; H04W 64/00
See application file for complete search history.

(56) References Cited

U.S. PATENT DOCUMENTS 9,510,133 B2 * 11/2016 Gupta ..................... H04W 4/70
2004/0165563 A1 8/2004 Hsu
(Continued)

FOREIGN PATENT DOCUMENTS

WO WO2015180075 A1 12/2015
WO WO2016012578 A1 1/2016
(Continued)

OTHER PUBLICATIONS

Cundy, Search Report under Section 17, GB Application No. GB1717533.2, Intellectual Property Office of the United Kingdom, dated Apr. 20, 2018.
(Continued)

*Primary Examiner* — Xavier Szewai Wong
(74) *Attorney, Agent, or Firm* — Matthew C. Loppnow; The Watson I.P. Group, PLC (57) ABSTRACT

A method and apparatus operate a device on a licensed spectrum and an unlicensed spectrum. The device can operate on a Wireless Wide Area Network (WWAN) channel via a WWAN base station using a WWAN Radio Access Technology (RAT). The device can detect at least one WWAN RAT Wireless Local Area Network (WLAN) base station using the WWAN RAT operating on a WLAN frequency. The device can communicate with the WWAN RAT WLAN base station on a WWAN RAT WLAN channel operating on the WLAN frequency. The device can scan WLAN frequencies. A WLAN access point load on the WWAN RAT WLAN channel can be calculated based on scanning the WLAN frequencies, where a WLAN access point uses a WLAN RAT. The device can disable communication using the WWAN RAT WLAN channel when the WLAN access point load exceeds a threshold and allow communication on the WWAN channel when the WLAN access point load exceeds a threshold.

20 Claims, 7 Drawing Sheets

(51) Int. Cl.
*H04W 48/16* (2009.01)
*H04W 28/02* (2009.01)
*H04W 48/18* (2009.01)
*H04W 64/00* (2009.01)
*H04W 84/12* (2009.01)
*H04W 88/08* (2009.01)
*H04W 88/06* (2009.01)

(52) U.S. Cl.
CPC ........... *H04W 48/16* (2013.01); *H04W 48/18* (2013.01); *H04W 64/00* (2013.01); *H04W 64/003* (2013.01); *H04W 84/12* (2013.01); *H04W 88/06* (2013.01); *H04W 88/08* (2013.01)

(56) References Cited

U.S. PATENT DOCUMENTS

| | | |
|---|---|---|
| 2008/0096565 A1 | 4/2008 | Jin |
| 2008/0101291 A1* | 5/2008 | Jiang .................. H04L 63/08 370/331 |
| 2010/0091731 A1 | 4/2010 | Kim |
| 2013/0083783 A1* | 4/2013 | Gupta .................. H04W 4/70 370/338 |
| 2013/0203432 A1 | 8/2013 | Wang |
| 2014/0133294 A1* | 5/2014 | Horn ................ H04W 28/0247 370/230 |
| 2014/0185494 A1 | 7/2014 | Yang |
| 2014/0354336 A1* | 12/2014 | Syllaios .................. H03L 7/093 327/157 |
| 2015/0029879 A1* | 1/2015 | Chou ...................... H04W 4/70 370/252 |
| 2015/0103812 A1* | 4/2015 | Zhao ..................... H04W 48/16 370/338 |
| 2015/0117357 A1 | 4/2015 | Ozturk |
| 2015/0223115 A1 | 8/2015 | Liang et al. |
| 2015/0365972 A1 | 12/2015 | Seok |
| 2015/0382342 A1* | 12/2015 | Seok ................ H04W 74/0816 370/336 |
| 2016/0277064 A1 | 9/2016 | Waxman |
| 2017/0311242 A1* | 10/2017 | Puranik ................ H04W 48/18 |

FOREIGN PATENT DOCUMENTS

WO WO2016089801 A1 6/2016
WO WO2018052734 A1 3/2018

OTHER PUBLICATIONS

Huynh, U.S. Appl. No. 15/269,874, U.S. Patent and Trademark Office, Mar. 26, 2018.
Wong, U.S. Appl. No. 15/341,914, U.S. Patent and Trademark Office, Apr. 6, 2018.

* cited by examiner

METHOD AND APPARATUS FOR OPERATING A DEVICE ON A LICENSED SPECTRUM AND AN UNLICENSED SPECTRUM

CROSS-REFERENCE TO RELATED APPLICATIONS

This application is related to an application entitled "Method and Apparatus for Operating a Device on a Licensed Spectrum and an Unlicensed Spectrum," U.S. patent application Ser. No. 15/269,874, filed on Sep. 19, 2016, and an application entitled "Method and Apparatus for Operating a Device on a Licensed Spectrum and an Unlicensed Spectrum," U.S. patent application Ser. No. 15/341,914, filed on even date herewith, both commonly assigned to the assignee of the present application, which are hereby incorporated by reference.

BACKGROUND

1. Field

The present disclosure is directed to a method and apparatus for operating a device on a licensed spectrum and an unlicensed spectrum. More particularly, the present disclosure is directed to operating a device on a licensed spectrum and an unlicensed spectrum using the same radio access technology.

2. Introduction

Presently, people use wireless communication devices to make calls, read electronic mail, surf the Internet, stream movies, download files, connect to other devices, and perform other wireless communication actions. Wireless communication devices include smartphones, cellular phones, laptop computers, tablet computers, connected home devices, televisions, set top boxes, and other wireless communication devices. Many of these devices can send and receive data on multiple radio access technologies, such as cellular, Long Term Evolution (LTE), IEEE 802.11 (Wi-Fi), IEEE 802.15.1 (Bluetooth), and other radio access technologies. LTE and other carrier grade services operate on licensed frequency bands. IEEE 802.11 services, such as for a Wireless Local Area Network (WLAN), operate on both 2.4 GHz and 5 GHz unlicensed frequency bands.

LTE Advanced is a radio access technology that has been proposed for providing carrier-grade wireless service in the 5 GHz, unlicensed band. Until today, IEEE 802.11 has been the most popular choice for radio access in the unlicensed space. However, wireless wide area network, such as LTE, technology, originally envisioned for cellular operation only in licensed bands, has significant performance gains over Wi-Fi when operating in the unlicensed band. Some advantages of LTE Advanced include better and more reliable links, better performance, better efficiency in Medium Access Control (MAC), better wireless communication device management, and excellent coverage. Unfortunately, because LTE Advanced operates in the same 5 GHz unlicensed band as IEEE 802.11, there are problems with conflicts between the two radio access technologies.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for operating a device on a licensed spectrum and an unlicensed spectrum. According to a possible embodiment, a device can operate on a Wireless Wide Area Network (WWAN) channel via a WWAN base station using a WWAN Radio Access Technology (RAT). The device can detect at least one WWAN RAT Wireless Local Area Network (WLAN) base station using the WWAN RAT operating on a WLAN frequency. The device can communicate with the WWAN RAT WLAN base station on a WWAN RAT WLAN channel operating on the WLAN frequency. The device can scan WLAN frequencies. A WLAN access point load on the WWAN RAT WLAN channel can be calculated based on scanning the WLAN frequencies, where a WLAN access point uses a WLAN RAT. The device can disable communication using the WWAN RAT WLAN channel when the WLAN access point load exceeds a threshold and allow communication on the WWAN channel when the WLAN access point load exceeds a threshold.

Figure 1:
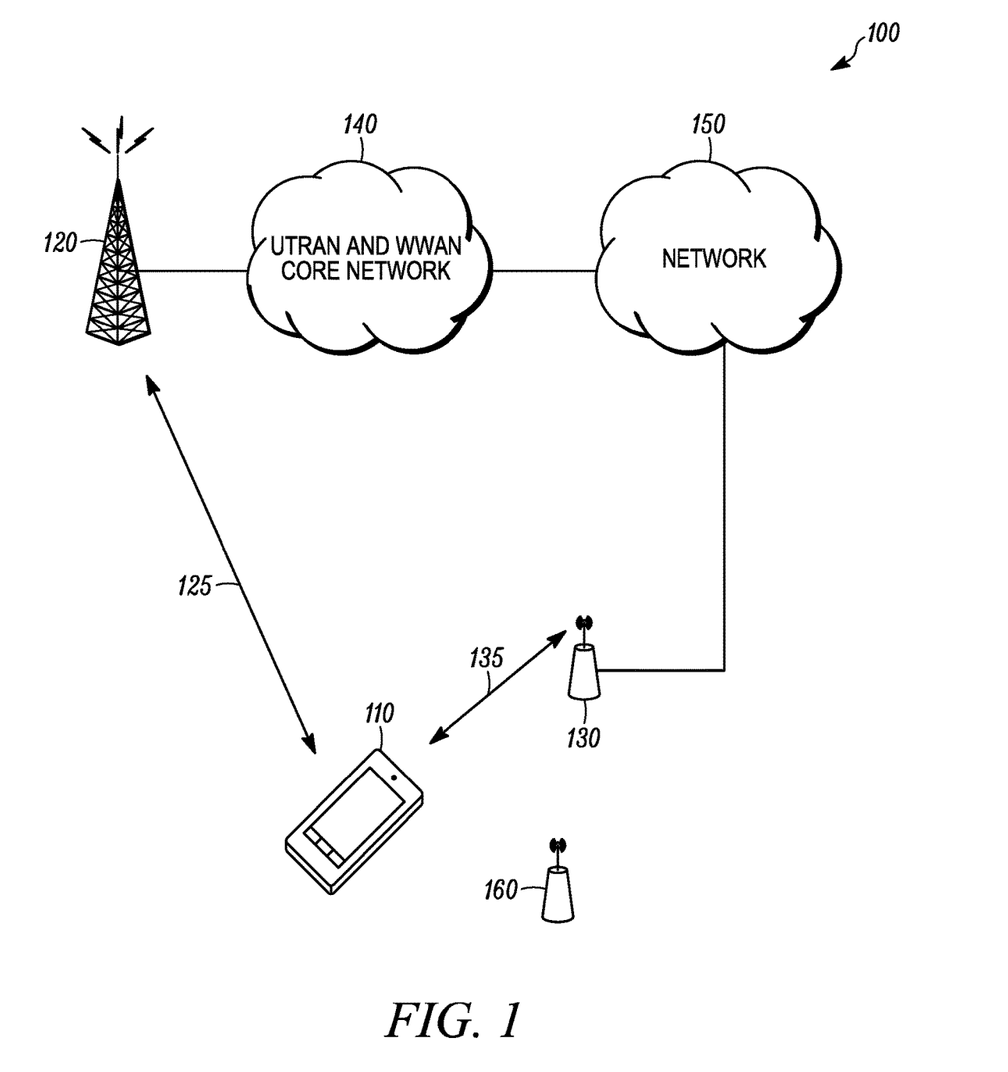
FIG. 1 is an example block diagram of a system according to a possible embodiment.

FIG. 1 is an example block diagram of a system 100 according to a possible embodiment. The system 100 can include a wireless communication device 110, a wireless wide area network base station 120 that uses a wireless wide area network radio access technology, a wireless local area network base station 130 that also uses the wireless wide area network radio access technology, a Universal Terrestrial Radio Access Network (UTRAN) and wireless wide area network core network 140, and a global network 150 that can include a plurality of networks. The wireless communication device 110 can be user equipment, a wireless terminal, a portable wireless communication device, a smartphone, a cellular telephone, a flip phone, a personal digital assistant, a device having a subscriber identity module, a personal computer, a selective call receiver, a tablet computer, a laptop computer, or any other device that is capable of sending and receiving communication signals on a wireless network.

The wireless wide area network base station 120 can also be considered a WWAN RAT base station, a Long Term Evolution (LTE) base station, an enhanced NodeB (eNodeB or eNB), a base station that uses licensed cellular frequencies, or any other wireless wide area network base station. The wireless local area network base station 130 that also uses the wireless wide area network radio access technology can also be considered a WWAN RAT WLAN base station, a wireless wide area communication network advanced access point, an LTE Advanced eNodeB, an LTE-U base station, or other base station or access point that operates on unlicensed frequencies, such as the 5 GHz spectrum, using a WWAN RAT. For example, the wireless local area network base station 130 that uses the wireless wide area network radio access technology can be considered a WWAN RAT WLAN because it uses the same WWAN RAT as the WWAN RAT base station 120 while operating on WLAN frequencies.

In operation, the device 110 can communicate with both the wireless wide area network base station 120 and the wireless local area network base station 130 using the same wireless wide area network radio access technology. For example, the device 110 can operate using an LTE Advanced radio access technology by communicating with the wireless wide area network base station 120 using a licensed band/frequency such as Long Term Evolution (LTE) band 4, and can communicate with the wireless local area network base station 130 using a 5 GHz unlicensed band/frequency, such as LTE band 255, for LTE Advanced communication. When communicating with both base stations 120 and 130, the device 110 can receive carrier aggregated data from both base stations 120 and 130. When communicating with the wireless local area network base station 130 using LTE band 255, the device 110 may not be connected to an 802.11 access point 160 to avoid signal interference because both radio access technologies can operate in the 5 GHz unlicensed band.

LTE Advanced radio access technologies can include LTE in Unlicensed spectrum (LTE-U), License Assisted Access (LAA), LTE-Wi-Fi Aggregation (LWA), MulteFire, and other wireless wide area network advanced radio access technologies that provide for communication on both a wireless wide area network and a wireless local area network. These radio access technologies may require that the device 110 operates on a corresponding wireless local area network base station 130 using a clean channel According to a possible embodiment, an uplink channel, such as a paging channel, and a signaling channel can be on an LTE licensed channel, while received data can be on one or on both of a licensed channel and an unlicensed 5 GHz spectrum channel.

Figure 2:
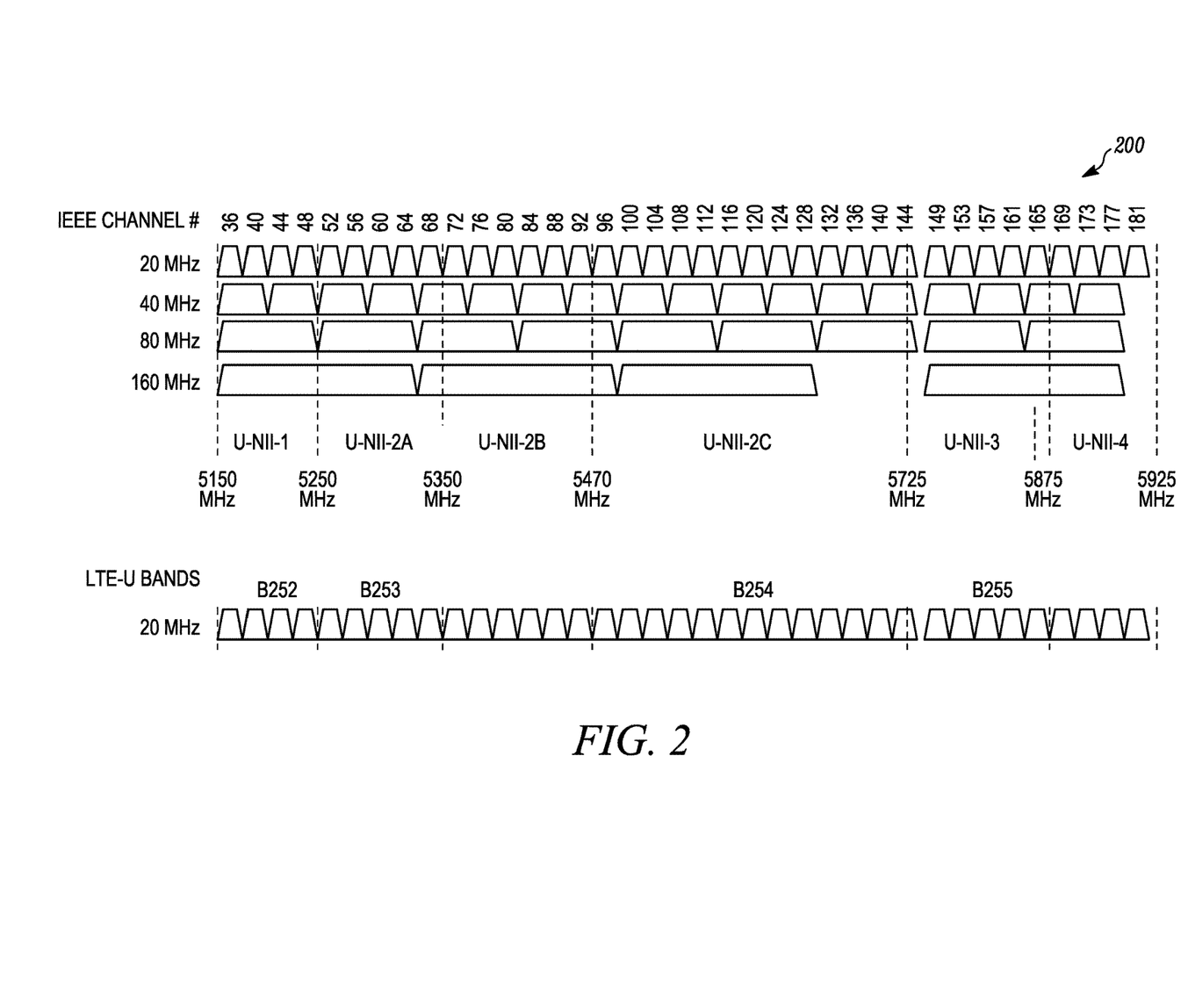
FIG. 2 is an example illustration of Unlicensed National Information Infrastructure bands according to a possible embodiment.

FIG. 2 is an example illustration of Unlicensed National Information Infrastructure (U-NII) bands U-NII-1 through U-NII-4 in the unlicensed 5 GHz spectrum 200 ranging from 5,150 MHz through 6,925 MHz according to a possible embodiment. Various IEEE 802.11 channels ranging from 36-181 can operate in the 5 GHz spectrum. These channels can be combined to have bandwidths of 20 MHz, 40 MHz, 80 MHz, and 160 MHz. LTE Advanced can also operate in the 5 GHz spectrum. For example, LTE-U bands B252, B253, B254, and B255 can operate in the 5 GHz spectrum and additional bands can be added. Initial deployments of LTE-U can support bands B252 and B255, while bands B253 and B254 can be in the Dynamic Frequency Selection (DFS) spectrum. Within each LTE-U band, there can be multiple 20 MHz wide channels that can be used.

Referring back to FIG. 1, a downlink in a communication signal 135 from the WWAN RAT WLAN base station 130 operating in the 5 GHz spectrum in the system 100 can supplement a downlink in a communication signal 125 from the WWAN base station 120 for carrier aggregation using different scenarios. Carrier Aggregation (CA) can be done to boost wireless wide area network data throughput under different wireless wide area network band combinations for supplemental downlink reception.

TABLE 1

LTE-U supplemental downlink carrier aggregation scenarios

| # | Band Combination | Licensed Band | Unlicensed Band | BW (MHz) | CA Configuration |
|---|---|---|---|---|---|
| 1 | B13 + B252 + B252 | B13 | U-NII-1 | 10 + 20 + 20 | inter-band + unlicensed |
|   | B13 + B255 + B255 | B13 | U-NII-3 | 10 + 20 + 20 | intra-band contiguous DL CA w/o UL CA |
| 2 | B13 + B252 | B13 | U-NII-1 | 10 + 20 | inter-band DL CA without |
|   | B13 + B255 | B13 | U-NII-3 | 10 + 20 | UL CA |
| 3 | B2 + B252 + B252 | B2 | U-NII-1 | [5, 10, 15, 20] + 20 + 20 | inter-band + unlicensed |
|   | B2 + B255 + B255 | B2 | U-NII-3 | [5, 10, 15, 20] + 20 + 20 | intra-band contiguous DL CA w/o UL CA |
| 4 | B2 + B252 | B2 | U-NII-1 | [5, 10, 15, 20] + 20 | inter-band DL CA without |
|   | B2 + B255 | B2 | U-NII-3 | [5, 10, 15, 20] + 20 | UL CA |
| 5 | B4 + B252 + B252 | B4 | U-NII-1 | [5, 10, 15, 20] + 20 + 20 | inter-band + unlicensed |
|   | B4 + B255 + B255 | B4 | U-NII-3 | [5, 10, 15, 20] + 20 + 20 | intra-band contiguous DL CA w/o UL CA |
| 6 | B4 + B252 | B4 | U-NII-1 | [5, 10, 15, 20] + 20 | inter-band DL CA without |
|   | B4 + B255 | B4 | U-NII-3 |  | UL CA |

As shown in Table 1, the LTE and LTE-U Operating bands for carrier aggregation can be with LTE bands B2/B4/B13 and LTE-U bands B252/B255. The other LTE bands may or may not be used for carrier aggregation. The LTE and LTE-U aggregation can be for 20 MHz wide channels, where initial deployments can be for scenarios 2, 4, and 6 in Table 1.

For LTE Advanced, such as LTE-U, deployment methodology, factors including deployment layout, channel model, available spectrum, and other factors can be considered for coexistence performance between 802.11 and LTE-U systems, as well as between different LTE-U nodes, such as LTE-U base stations. For example, when LTE is simply deployed in unlicensed spectrum without any coexistence mechanism, LTE can cause performance degradation on coexisting neighbor 802.11 systems. Managing the coexistence of Wi-Fi and LTE-U can mitigate performance degradation for deployment of the LTE-U supported access points, such as wireless local area network base stations that use wireless wide area network radio access technology, in a wireless medium environment with 802.11. Methods to solve 802.11 and LTE-U coexistence can include Carrier Sense Adaptive Transmission (CSAT), channel selection, Opportunistic Supplemental Downlink (OSDL), and Listen Before Talk (LBT).

Figure 3:
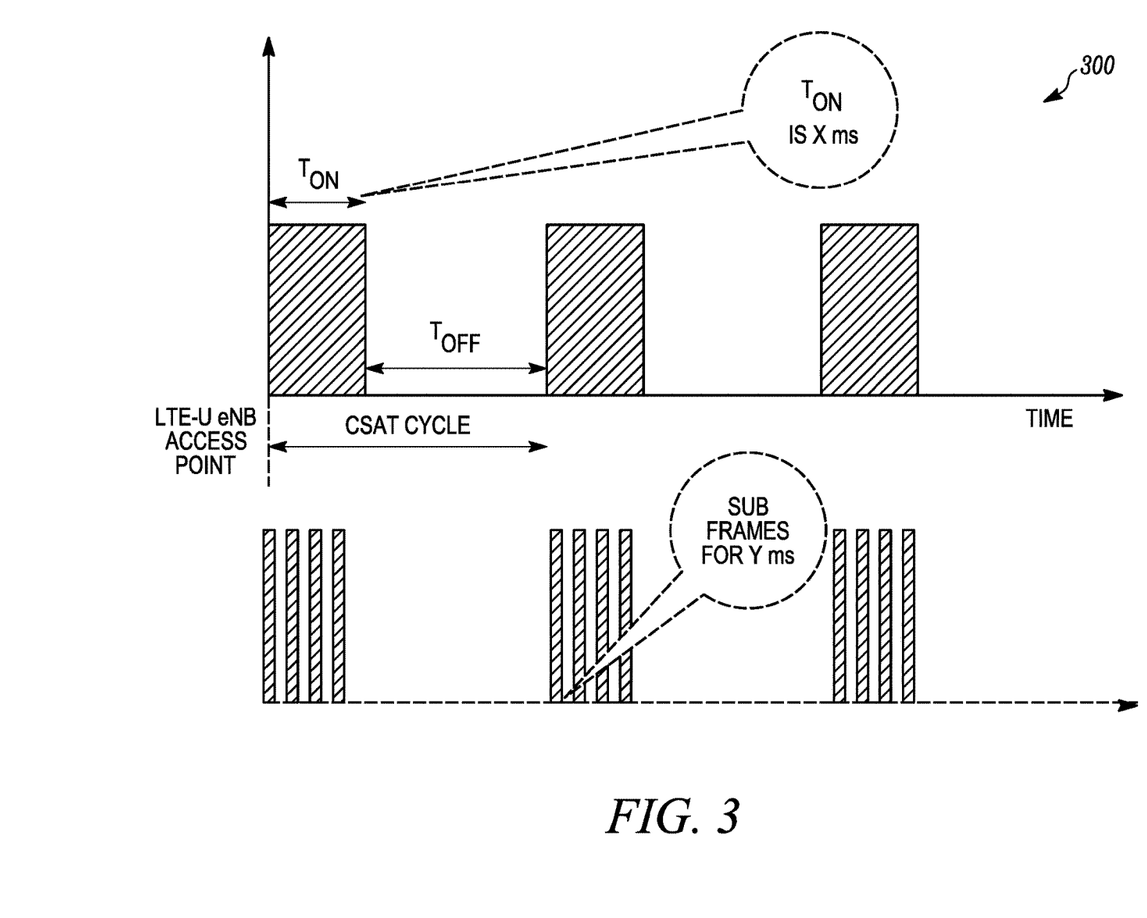
FIG. 3 is an example illustration of carrier sense adaptive transmission according to a possible embodiment.

FIG. 3 is an example illustration 300 of CSAT according to a possible embodiment. With CSAT, communication in unlicensed spectrum can be used to avoid and mitigate the interference between radio access technologies to use unlicensed 5 GHz spectrum for transmission, based on Time Division Multiplexing (TDM) communication patterns, which can be done periodically, where time slots up to 20-50 msec can be reserved for mobile operators, such as wireless wide area network operators. The CSAT cycle can be X ms apart, which can be repeated periodically. $T_{ON}$ can be the duration when a LTE base station can transmit the data to a wireless communication device for aggregation. $T_{OFF}$ can be the duration when the LTE base station may not transmit any data to device. For latency sensitive application such as Voice over Wi-Fi Calling (VoWFC) the $T_{ON}$ can be divided into sub frames for Y ms. X ms and Y ms can be configured by a mobile, such as LTE, operator and dynamically changed based on the interference and data load. The value of X and Y in the CSAT cycle can be dynamic and can be configured at run time by the operator, which may or may not bring down the whole throughput of the network.

For the channel selection solution for coexistence, the cleanest channel in general can be chosen where 802.11 primary channels can be avoided, channels occupied by other LTE-U operators can be avoided, and the channel occupied by the same LTE-U operator can be chosen. The channel selection can further be based on network operator decisions. For the OSDL solution for coexistence, data transmissions can be avoided if there is a small amount of traffic. For example, if the data activity for the LTE usage is below certain threshold, then the LTE-U CSAT cycle can be shut down and legacy behavior can be used.

CSAT polling can be of a fixed duration, while LBT can be dynamic. For example, in LBT, a radio transceiver can first sense, such as listen to, a channel before it starts a transmission. If a selected channel is busy, the radio transceiver can wait until the channel is free. If the channel is not busy, the radio transceiver can start the transmission.

Figure 4:
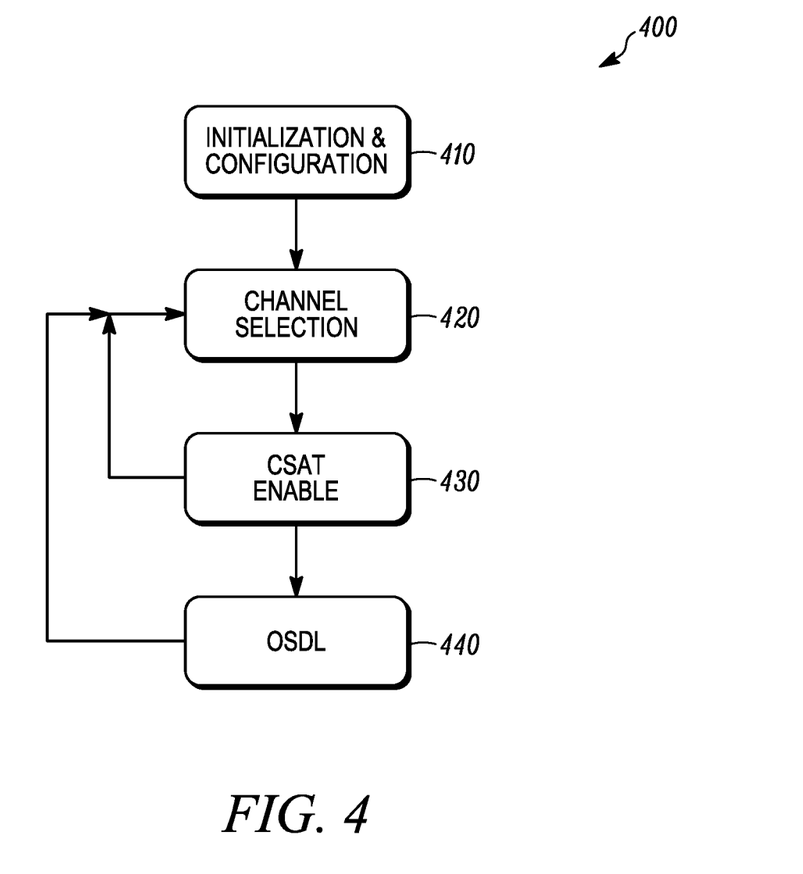
FIG. 4 is an example state diagram for LTE-U coexistence according to a possible embodiment.

FIG. 4 is an example state diagram 400 for LTE-U coexistence according to a possible embodiment. At 410, coexistence initiation and configuration can be administered by the mobile operator. At 420, channel selection can be performed. The channel selection algorithm can be specific to the vendor that provided the chip for the LTE-U access point/base station. At 430, then CSAT can be enabled and the CSAT duty cycle can be controlled based on the traffic and load on the network. At 440, OSDL can shut off the LTE-U completely when the system identifies the data quantity to be transmitted on LTE-U band is less.

Embodiments can provide for 5 GHz channel selection for a wireless local area network base station using wireless wide area network radio access technology for LTE Advanced systems, such as LTE-U, LAA, LWA, MulteFire, and other systems that employ a wireless local area network base station using wireless wide area network radio access technology. Embodiments can allow all carriers to be up to date with information about the 5 GHz environment and its channel load. This can help the carriers change the base station channel in the 5 GHz spectrum to provide the least interference in the 5 GHz environment.

Figure 5:
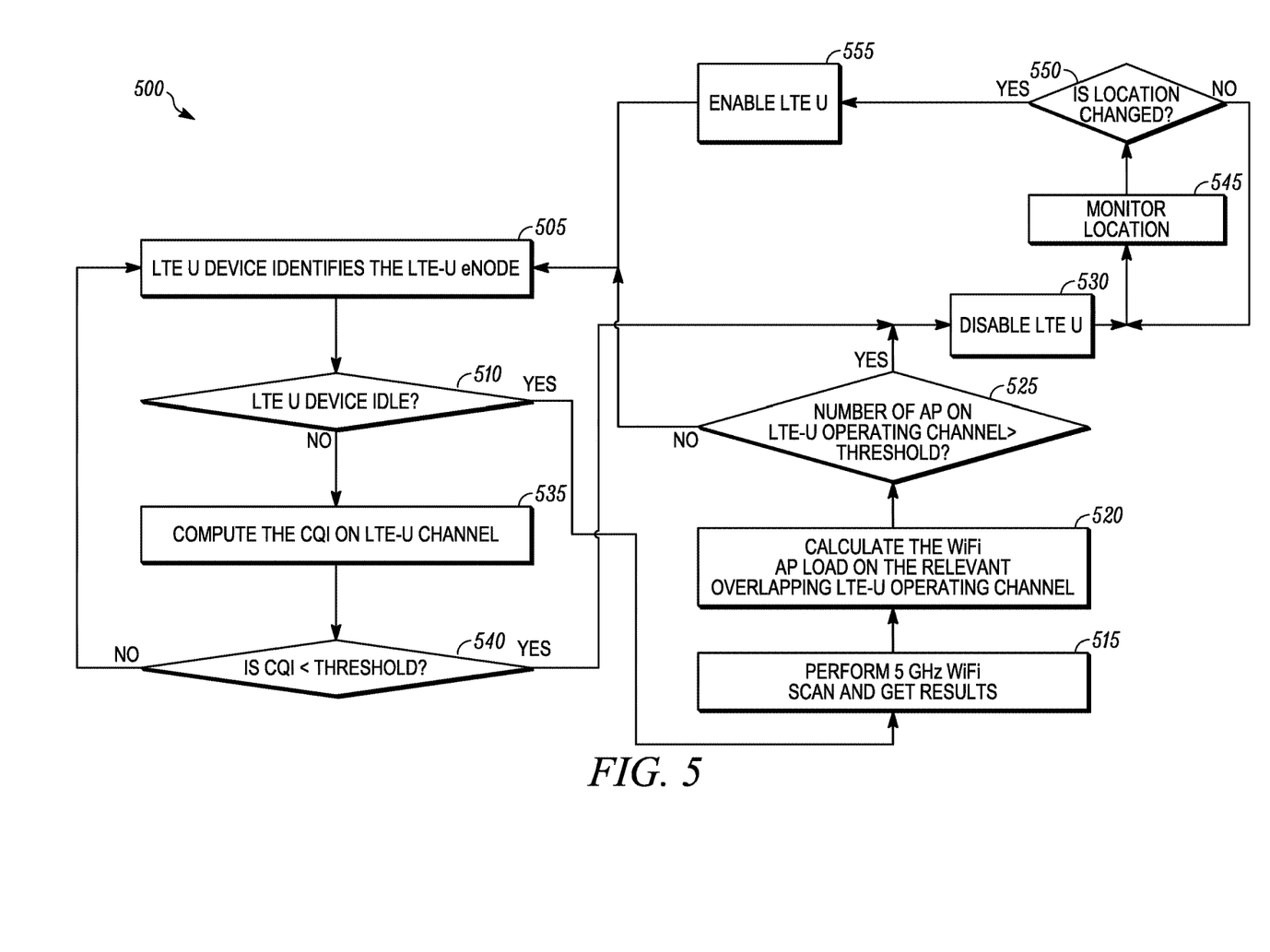
FIG. 5 is an example flowchart illustrating the operation of a wireless communication system according to a possible embodiment.

FIG. 5 is an example flowchart 500 illustrating the operation of a wireless communication system, such as the system 100, according to a possible embodiment. At 505, a LTE-U device, such as the device 110, can identify an LTE-U 5 GHz eNodeB operating in the 5 GHz spectrum, such as a wireless local area network base station using a WWAN RAT. At 510, the LTE-U device can monitor its idle state on the 5 GHz spectrum. If the LTE-U device is idle on the 5 GHz spectrum, at 515, the LTE-U device can scan the 5 GHz spectrum, such as unlicensed frequencies used by 802.11/Wi-Fi systems. At 520, the device can calculate the Wi-Fi access point load on relevant Wi-Fi channels that overlap an LTE-U operating channel of the LTE-U 5 GHz eNodeB. If at 525, the number of access points on the LTE-U operating channel is less than a threshold, the device can continue operation with the LTE-U eNodeB. If at 525, the number of access points on the LTE-U operating channel is greater than the threshold, at 530, the device can disable LTE-U communication.

If at 510 the device is not idle, at 535, the device can calculate the Channel Quality Indicator (CQI) of the LTE-U it is operating on with the LTE-U eNodeB. At 540, if 540 the CQI is greater than a threshold, then the device can continue operation with the LTE-U eNodeB. At 540, if the CQI is less than a threshold, at 530, the device can disable LTE-U communication. According to a possible implementation, the CQI can be based on a Packet Error Rate (PER), where a high packet error rate can result in a low CQI.

At 545, the device can monitor its location. At 550, the device can determine if its location has changed. If the location has not changed significantly, the device can continue to monitor its location while LTE-U is disabled. If the location has changed, at 555, the device can enable LTE-U and search for an LTE-U node.

Figure 6:
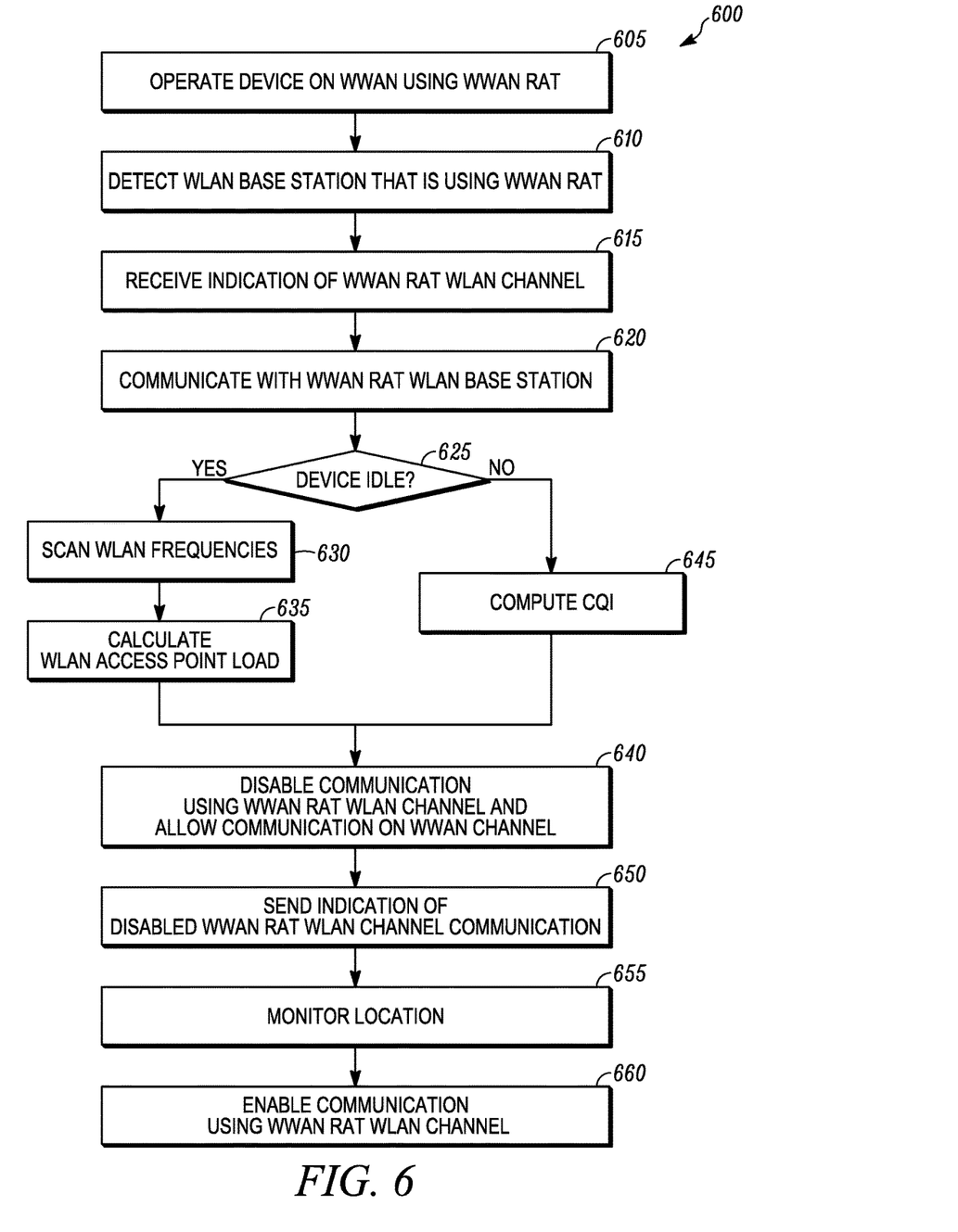
FIG. 6 is an example flowchart illustrating the operation of a wireless communication device according to a possible embodiment.

FIG. 6 is an example flowchart 600 illustrating the operation of a wireless communication device, such as the device 110, according to a possible embodiment. At 605, the device can operate on a WWAN channel via a WWAN base station using a WWAN RAT. The WWAN base station can be a cellular base station, an LTE base station, a licensed frequency base station, an eNodeB, and/or any other WWAN base station using a corresponding wireless technology channel. The WWAN RAT can be a LTE-based RAT, can be a IEEE 802.16m RAT, or other WWAN RATs, such as RATs common to a given cellular and/or WWAN service provider. For example, the WWAN can be an LTE-based network. Other RATs can include 802.11 RATs, 802.15 RATs, and other RATs.

At 610, the device can detect at least one WWAN RAT WLAN base station using the WWAN RAT operating on a WLAN frequency. The WLAN RAT WLAN base station can be a local base station, a base station operating in a 5 GHz spectrum, a base station operating on an unlicensed frequency spectrum, and/or any other WLAN base station using a WWAN RAT WLAN channel. The WLAN frequency that the WWAN RAT operates on can include a plurality of WLAN frequencies that overlap with WLAN frequencies of an 802.11 RAT. A channel of the WLAN frequencies can be a channel in frequencies for IEEE.802.11 channels 36-181 corresponding to LTE-U U-NII-1 through U-NII-4, as well as other similar frequencies. The WLAN base station using the WWAN RAT and the WWAN base station using the WWAN RAT can be base stations of a same service provider.

At 615, an indication of the WWAN RAT WLAN channel can be received from a network operator. The indication can be received via a WLAN, a WWAN, or any other network system. For example, a WWAN network operator can set the LTE-U channel in a WLAN LTE-U eNB, such as a WWAN RAT WLAN base station, and send the channel to the device.

At 620, the device can communicate with the WWAN RAT WLAN base station on a WWAN RAT WLAN channel operating on the WLAN frequency. Communicating can include receiving carrier aggregated data on a combination of the WWAN channel and the WWAN RAT WLAN channel Information can also just be communicated on one or the other of the WWAN RAT WLAN and WWAN channels/base stations.

At 625, a determination can be made as to whether the device is idle on the WLAN frequency. If the device is idle, at 630, the device can scan WLAN frequencies. The WLAN frequencies can be scanned using an 802.11 transceiver, an LTE-U receiver that can be part of a transceiver, both an 802.11 transceiver and an LTE-U receiver, and/or any other element that can scan WLAN frequencies. Scanning can be done when a LTE-U receiver on the device is otherwise idle. The scanned WLAN frequencies can be frequencies for IEEE.802.11 Channels 36-181 corresponding to frequencies for LTE-U U-NII-1 through U-NII-4, as well as other similar frequencies in the 5 GHz spectrum. Scanning can include scanning for a beacon and/or probing for a response. A base station can typically transmit the beacon every 100 ms. When probing for a response, the device can send one probe request on a given channel and multiple base stations that are operating on that channel can then send a probe response. A beacon and/or a probe response can include WLAN information such as a Service Set Identifier (SSID) of a WLAN and/or corresponding base station, a Basic Service Set Identifier (BSSID), such as a Medium Access Control (MAC) address of an 802.11 chipset running on the base station, a channel of the base station, capabilities of the base station, and other information. At least some of this information can be sent as the results of scanning the WLAN frequencies. Information about at least one WLAN base station can be determined based on scanning the WLAN frequencies and thus can be part of the results of scanning the WLAN frequencies.

At 635, a WLAN access point load on the WWAN RAT WLAN channel can be calculated based on scanning the WLAN frequencies, where a WLAN access point can use a WLAN RAT. The load on an access point can be calculated by a device and/or by an access point or base station itself on a network side. To calculate the access point load by a device, the device can scan all of the relevant channels, such as channels 36, 40, 44, 48, 149, 153, 157, 161, 165, etc. The device can compute the number of different beacons, such as specific to a Basic Service Set Identification (BSSID), present in each channel, which can help to identify how many access points are using a particular channel, which can help identify the number of access points in each channel.

According to another possible implementation for calculating an access point load by a device for access points that support 802.11k/v, the device can observe that all channels are occupied by access points. The device may not know how many other devices are associated with particular access points and may not know that data activity among devices. The device can query the access point(s) for Radio Resource Metrics (RRM). If any access point supports 802.11k, then the access point can provide information at any moment of time when query comes from device. The information can be included in request report measurements that can include a beacon, a frame, a channel load, a noise histogram, station statistics, Location Configuration Information (LCI), a neighbor report, a link measurement, a transmit stream/category measurement, and other information. A request only mechanism can be a measurement pause and a report only mechanism can be measurement pilot. These measurement mechanisms can provide the capability for a device to manage and query its radio environment, and to make appropriate assessments about channel health and efficiency.

According to a possible embodiment, when there is an environment with several access points and devices operating in the same frequency range, there can be increased channel congestion which can result in high latency and lower throughput in systems operating on a crowded channel. The device can scan for all the access points that are in its vicinity to determine the access point load in an effort to mitigate the high latency and lower throughput.

The load on an access point channel can also be calculated by dividing the number of Access Points (APs) beaconing on the specific channel. The formula for computing the channel load (CHLx) on each channel of N channels can use a Received Signal Strength Indicator (RSSI) of each access point and can be $$CHLx=((RSSI+200)AP1+(RSSI+200)AP2+ \ldots +(RSSI+200)APn)/N.$$

At 640, the device can disable communication using the WWAN RAT WLAN channel when the WLAN access point load exceeds a threshold and allow communicating on the WWAN channel when the WLAN access point load exceeds a threshold. The enabled communication can be performed after a WWAN network operator sets the LTE-U channel in the WLAN LTE-U eNB.

If the device is not idle at 625, at 645, a CQI of the WWAN RAT WLAN channel can be computed. Then, at 640, communication using the WWAN RAT WLAN channel can be disabled when the CQI is below a threshold and communication using the WWAN RAT WLAN channel can be allowed when the CQI is below a threshold.

At 650, information indicating communication was disabled using the WWAN RAT WLAN channel can be sent to a WWAN RAT service provider. For example, this can help the service provider, such as a carrier, get this information from various devices. The service provider can then check which periods of time the WWAN RAT WLAN base stations are not helping devices in certain regions. The service provider can then deactivate WWAN RAT WLAN operation in certain regions for a certain period when the WWAN RAT WLAN base stations are not helping.

At 655, a location of the device can be monitored. Examples of systems that provide positioning information for monitoring the location of the device can include Global Positioning System (GPS), Global Navigation Satellite System (GNSS), cellular triangulation, deduced reckoning, Wi-Fi location, Bluetooth beacons, and/or other systems that provide positioning information. At 660, communication using a WWAN RAT WLAN channel can be enabled when the location of the device has changed. A determination of whether the location has changed can be a combination of positioning information along with scan results, such as by knowing that there are different WLAN access points. A given distance that indicates a location change can be based on a distance from a given access point. For example, a geofence can be created based on the effective range of an access point and the location of change can be based on a distance at or past the geofence. The change of location can also be based on the device moving a significant distance that would change the determination of the load on the channel.

Figure 7:
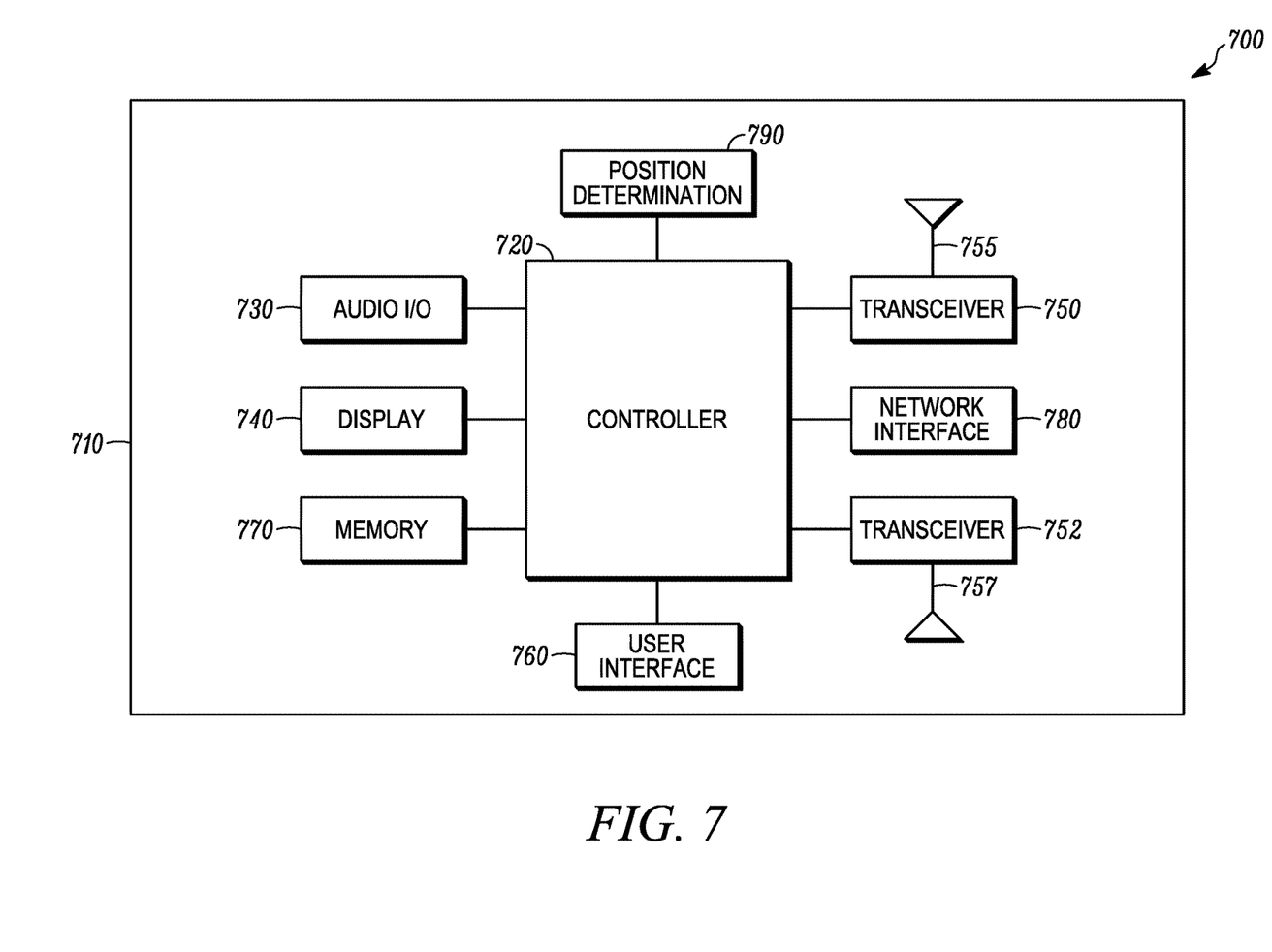
FIG. 7 is an example block diagram of an apparatus according to a possible embodiment.

FIG. 7 is an example block diagram of an device 700, such as the wireless communication device 110, the base station 120, the access point 130, a network controller, or another communication device, according to a possible embodiment. The device 700 can include a housing 710, a controller 720 within the housing 710, audio input and output circuitry 730 coupled to the controller 720, a display 740 coupled to the controller 720, a first transceiver 750 coupled to the controller 720, an antenna 755 coupled to the first transceiver 750, a second transceiver 752 coupled to the controller 720, an antenna 757 coupled to the second transceiver 752, a user interface 760 coupled to the controller 720, a memory 770 coupled to the controller 720, a network interface 780 coupled to the controller 720, and a position determination block 790 coupled to the controller 720. The device 700 can perform the methods described in all the embodiments.

The display 740 can be a viewfinder, a liquid crystal display (LCD), a light emitting diode (LED) display, a plasma display, a projection display, a touch screen, or any other device that displays information. The first and second transceivers 750 and 752 can each include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a WLAN transceiver, or any other interface that can connect a device to a network, device, or computer and that can transmit and receive data communication signals. The memory 770 can include a random access memory, a read only memory, an optical memory, a flash memory, a removable memory, a hard drive, a cache, or any other memory that can be coupled to a device.

The position determination block 790 can be a GPS receiver, can be a GNSS receiver, can determine cellular triangulation, can provide deduced reckoning, can determine Wi-Fi location, can use Bluetooth beacons, and/or can be any other block or blocks that provide(s) positioning information. The position determination block 790 can be hardware, can be software, can reside within the controller 720, can be separate from the controller 720, can be multiple blocks both within and separate from the controller 720, can be a combination of software and hardware, and/or can be any other block or blocks that provide device position information.

The device 700 or the controller 720 may implement any operating system, such as Microsoft Windows®, UNIX®, or LINUX®, Android™, or any other operating system. Device operation software may be written in any programming language, such as C, C++, Java or Visual Basic, for example. Device software may also run on an application framework, such as, for example, a Java® framework, a .NET® framework, or any other application framework. The software and/or the operating system may be stored in the memory 770 or elsewhere on the device 700. The device 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating a device and implementing the disclosed embodiments.

In operation, the first transceiver 750 can operate the device 700 on a WWAN channel via a WWAN base station using a WWAN RAT. The second transceiver 752 can detect at least one WWAN RAT WLAN base station using the WWAN RAT operating on a WLAN frequency. The controller 720 can receive an indication of a WWAN RAT WLAN channel from a network operator. The second transceiver 752 can communicate with the WWAN RAT WLAN base station on the WWAN RAT WLAN channel operating on the WLAN frequency. The second transceiver 752 can receive carrier aggregated data on a combination of the WWAN channel and the WWAN RAT WLAN channel.

The controller 720 can scan WLAN frequencies, such as via the second transceiver 752 and/or another WLAN transceiver. The WLAN frequencies can be scanned when the second transceiver 752 is otherwise idle, such as when it is not communicating with the WWAN RAT WLAN base station. The controller 720 can determine a WLAN access point load on the WWAN RAT WLAN channel based on scanning the WLAN frequencies, where a WLAN access point uses a WLAN RAT.

The controller 720 can disable communication using the WWAN RAT WLAN channel when the WLAN access point load exceeds a threshold and allow communicating on the WWAN channel when the WLAN access point load exceeds a threshold. The controller 720 can also compute a CQI of the WWAN RAT WLAN channel, disable communication using the WWAN RAT WLAN channel when the CQI is below a threshold, and allow communication on the WWAN channel when the CQI is below a threshold. The controller 720 can send, to a WWAN RAT service provider, information indicating communication was disabled using the WWAN RAT WLAN channel. The controller 720 can additionally monitor a location of the device 700 and enable communication using a WWAN RAT WLAN channel if the location of the device has changed. For example, the controller 720 can monitor a location of the device 700 by using the position determination block 790.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a device, the method comprising:
   operating a device on a wireless wide area network channel via a wireless wide area network base station using a wireless wide area network radio access technology;
   detecting, by the device, at least one wireless wide area network radio access technology wireless local area network base station using the wireless wide area network radio access technology operating on a wireless local area network frequency;
   communicating, by the device, with the wireless wide area network radio access technology wireless local area network base station on a wireless wide area network radio access technology wireless local area network channel operating on the wireless local area network frequency;
   scanning, by the device, wireless local area network frequencies;
   calculating a wireless local area network access point load on the wireless wide area network radio access technology wireless local area network channel based on scanning the wireless local area network frequencies, where a wireless local area network access point uses a wireless local area network radio access technology, and where the access point load is based on a determined number of access points on wireless local area network frequencies; and
   disabling, by the device, communication using the wireless wide area network radio access technology wireless local area network channel if the wireless local area network access point load exceeds a threshold and allowing communication using the wireless wide area network channel if the wireless local area network access point load exceeds a threshold.

2. The method according to claim 1, further comprising:
   computing a channel quality indicator of the wireless wide area network radio access technology wireless local area network channel,
   wherein the method further comprises
   disabling communication using the wireless wide area network radio access technology wireless local area network channel if the channel quality indicator is below a threshold and allowing communication using the wireless wide area network channel if the channel quality indicator is below a threshold.

3. The method according to claim 1, further comprising:
   monitoring a location of the device; and
   enabling communication using a wireless wide area network radio access technology wireless local area network channel if the location of the device has changed.

4. The method according to claim 1, wherein communicating comprises receiving carrier aggregated data on a combination of the wireless wide area network channel and the wireless wide area network radio access technology wireless local area network channel.

5. The method according to claim 1, wherein the wireless wide area network comprises a long term evolution-based network and a wireless local area network comprises an 802.11 frequency-based network.

6. The method according to claim 1, wherein the wireless local area network frequencies comprise frequencies in a range of 4,915 MHz to 5,925 MHz.

7. The method according to claim 1, wherein the wireless local area network base station using the wireless wide area network radio access technology and the wireless wide area network base station using the wireless wide area network radio access technology are base stations of a same service provider.

8. The method according to claim 1, further comprising receiving an indication of the wireless wide area network radio access technology wireless local area network channel from a network operator.

9. The method according to claim 1, further comprising sending, to a wireless wide area network radio access technology service provider, information indicating communication was disabled using the wireless wide area network radio access technology wireless local area network channel.

10. The method according to claim 1, wherein scanning comprises scanning, by the device, wireless local area network frequencies if a wireless wide area network radio access technology wireless local area network transceiver of the device is idle.

11. A device comprising:
    a first transceiver to operate the device on a wireless wide area network channel via a wireless wide area network base station using a wireless wide area network radio access technology;
    a second transceiver to detect at least one wireless wide area network radio access technology wireless local area network base station using the wireless wide area network radio access technology operating on a wireless local area network frequency and communicate with the wireless wide area network radio access technology wireless local area network base station on a wireless wide area network radio access technology wireless local area network channel operating on the wireless local area network frequency; and
    a controller to
    scan wireless local area network frequencies,
    determine a wireless local area network access point load on the wireless wide area network radio access technology wireless local area network channel based on scanning the wireless local area network frequencies, where a wireless local area network access point uses a wireless local area network radio access technology, and where the access point load is based on a determined number of access points on wireless local area network frequencies, disable communication using the wireless wide area network radio access technology wireless local area network channel if the wireless local area network access point load exceeds a threshold, and allow communication using the wireless wide area network channel if the wireless local area network access point load exceeds a threshold.

12. The device according to claim 11, wherein the controller computes a channel quality indicator of the wireless wide area network radio access technology wireless local area network channel, disables communication using the wireless wide area network radio access technology wireless local area network channel if the channel quality indicator is below a threshold, and allows communication using the wireless wide area network channel if the channel quality indicator is below a threshold.

13. The device according to claim 11, wherein the controller monitors a location of the device and enables communication using a wireless wide area network radio access technology wireless local area network channel if the location of the device has changed.

14. The device according to claim 11, wherein the second transceiver receives carrier aggregated data on a combination of the wireless wide area network channel and the wireless wide area network radio access technology wireless local area network channel.

15. The device according to claim 11, wherein the wireless wide area network comprises a long term evolution-based network and a wireless local area network comprises an 802.11 frequency-based network.

16. The device according to claim 11, wherein the wireless local area network frequencies comprise frequencies in a range of 4,915 MHz to 5,925 MHz.

17. The device according to claim 11, wherein the wireless local area network base station using the wireless wide area network radio access technology and the wireless wide area network base station using the wireless wide area network radio access technology are base stations of a same service provider.

18. The device according to claim 11, wherein the controller receives an indication of the wireless wide area network radio access technology wireless local area network channel from a network operator.

19. The device according to claim 11, wherein the controller sends, to a wireless wide area network radio access technology service provider, information indicating communication was disabled using the wireless wide area network radio access technology wireless local area network channel.

20. The device according to claim 11, wherein the controller scans wireless local area network frequencies if the second transceiver is idle.

* * * * *